US011079947B2

(12) United States Patent
Sorenson et al.

(10) Patent No.: US 11,079,947 B2
(45) Date of Patent: Aug. 3, 2021

(54) ENSURING HARDWARE-MANAGEMENT-CONSOLE POWERUP AFTER EXTERNAL AC POWER LOSS

(71) Applicant: International Business Machines Corporation, Armonk, NY (US)

(72) Inventors: Todd C. Sorenson, Tucson, AZ (US); Gary W. Batchelor, Tucson, AZ (US); Ronald D. Martens, Benson, AZ (US); John C. Elliott, Tucson, AZ (US); Heidi L. Mccook, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 16/271,817

(22) Filed: Feb. 9, 2019

(65) Prior Publication Data
US 2020/0257461 A1 Aug. 13, 2020

(51) Int. Cl.
*G06F 3/00* (2006.01)
*G06F 3/06* (2006.01)
*G06F 1/30* (2006.01)

(52) U.S. Cl.
CPC ............ *G06F 3/0632* (2013.01); *G06F 1/30* (2013.01); *G06F 3/0604* (2013.01); *G06F 3/067* (2013.01)

(58) Field of Classification Search
None
See application file for complete search history.

(56) References Cited

U.S. PATENT DOCUMENTS

| 7,043,647 | B2 | 5/2006 | Hansen et al. |
| 7,814,368 | B2* | 10/2010 | Hogan ............... G06F 11/0742 714/22 |
| 7,930,575 | B2 | 4/2011 | Suginaka et al. |
| 2002/0138772 | A1 | 9/2002 | Crawford et al. |
| 2017/0235351 | A1 | 8/2017 | Zhou et al. |
| 2018/0052503 | A1 | 2/2018 | Sharma et al. |

FOREIGN PATENT DOCUMENTS

GB 2508041 A 5/2014

OTHER PUBLICATIONS

Tardy, Nerve, "Power management for server virtualization and integrated environments", 2016, Eaton, available at http://www.eaton.com/content/dam/eaton/markets/data-center/Power-mgmt-for-server-virtualization-integrated-environments.pdf.

\* cited by examiner

*Primary Examiner* — Midys Rojas
(74) *Attorney, Agent, or Firm* — Nelson and Nelson; Daniel P. Nelson

(57) ABSTRACT

A method to ensure that a hardware management console powers up after a storage system loses external AC power is disclosed. In one embodiment, such a method includes detecting loss of external AC power to a storage system. The loss of external AC power causes the storage system to operate on battery power. The method further initiates, in response to the loss, shutdown of a hardware management console associated with the storage system. The method starts a timer in response to initiation of the shutdown. When the timer expires, the method power cycles the hardware management console, thereby causing the hardware management console to power up and restart. A corresponding system and computer program product are also disclosed.

20 Claims, 7 Drawing Sheets

ENSURING HARDWARE-MANAGEMENT-CONSOLE POWERUP AFTER EXTERNAL AC POWER LOSS

BACKGROUND

Field of the Invention

This invention relates to systems and methods to ensure that a hardware management console powers up after a storage system loses external AC power.

Background of the Invention

When external AC power is lost to an enterprise storage system such as the IBM DS8000™ storage system, the storage system may terminate data access and initiate, under battery power, shutdown procedures such as dumping data in volatile memory (e.g., cache) to more persistent storage. In such cases, a pair of hardware management consoles (HMCs) associated with the storage system gracefully shut down under battery power to avoid file system corruption. When external AC power is restored to the enterprise storage system, the hardware management consoles typically need to be power cycled (i.e., have their power turned off and then on) to ensure that the hardware management consoles power back on. In some storage system power modes, the hardware management consoles are required to power on the rest of the storage system. Thus, if the hardware management consoles are not turned on, the rest of the storage system may not power up and the loss of data access on the storage system may be extended.

The hardware management consoles may also, in certain cases, provide an interface for the storage system to access remote encryption keys. These encryption keys may enable access to encrypted data on the storage system. Thus, if the hardware management consoles are not powered on, the storage system may have no way to access the encryption keys and the loss of data access on the storage system may be extended, even if the storage system is powered up and running.

Today, the DS8000™ storage system utilizes a proprietary uninterruptible power supply (UPS) to ensure that a hardware management console is always power cycled when the storage system operates on battery. However, if "off the shelf" UPSs are used, no such assurances may be provided. If external AC power is restored to an "off the shelf" UPS while it is performing its on-battery shutdown sequence, the UPS may abort the shutdown sequence and never cycle power to components that were running on battery power. This prevents the hardware management consoles from powering up after they have shut down due to loss of external AC power because the hardware management consoles themselves may have never lost power.

In view of the foregoing, what are needed are systems and methods to ensure that hardware management consoles are power cycled when a storage system loses external AC power. Ideally, such systems and methods will function even when the hardware management consoles themselves never lose power.

SUMMARY

The invention has been developed in response to the present state of the art and, in particular, in response to the problems and needs in the art that have not yet been fully solved by currently available systems and methods. Accordingly, systems and methods have been developed to ensure that a hardware management console powers up after a storage system loses external AC power. The features and advantages of the invention will become more fully apparent from the following description and appended claims, or may be learned by practice of the invention as set forth hereinafter.

Consistent with the foregoing, a method to ensure that a hardware management console powers up after a storage system loses external AC power is disclosed. In one embodiment, such a method includes detecting loss of external AC power to a storage system. The loss of external AC power causes the storage system to operate on battery power. The method further initiates, in response to the loss, shutdown of a hardware management console associated with the storage system. The method starts a timer in response to initiation of the shutdown. When the timer expires, the method power cycles the hardware management console, thereby causing the hardware management console to power up and restart.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
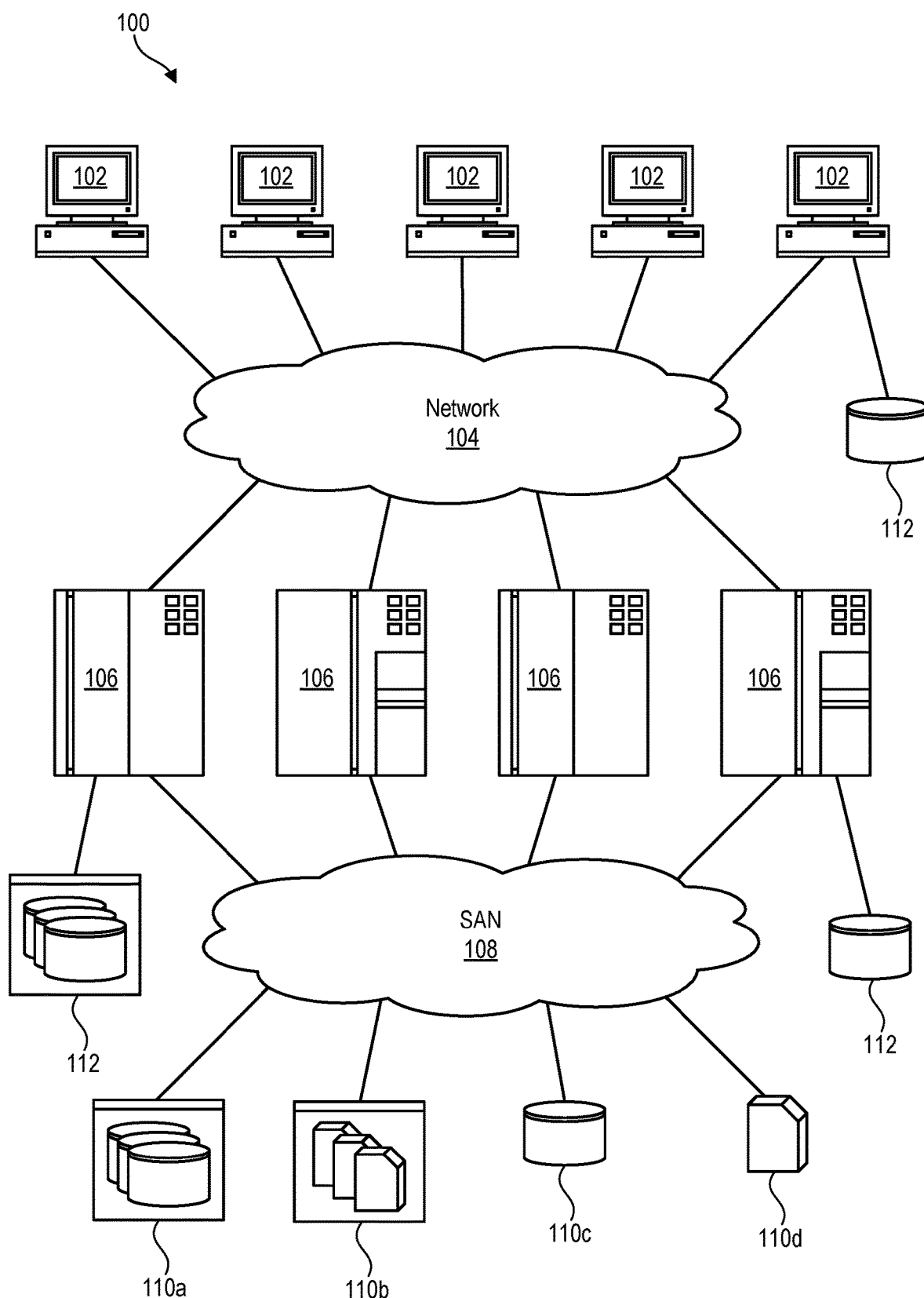
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
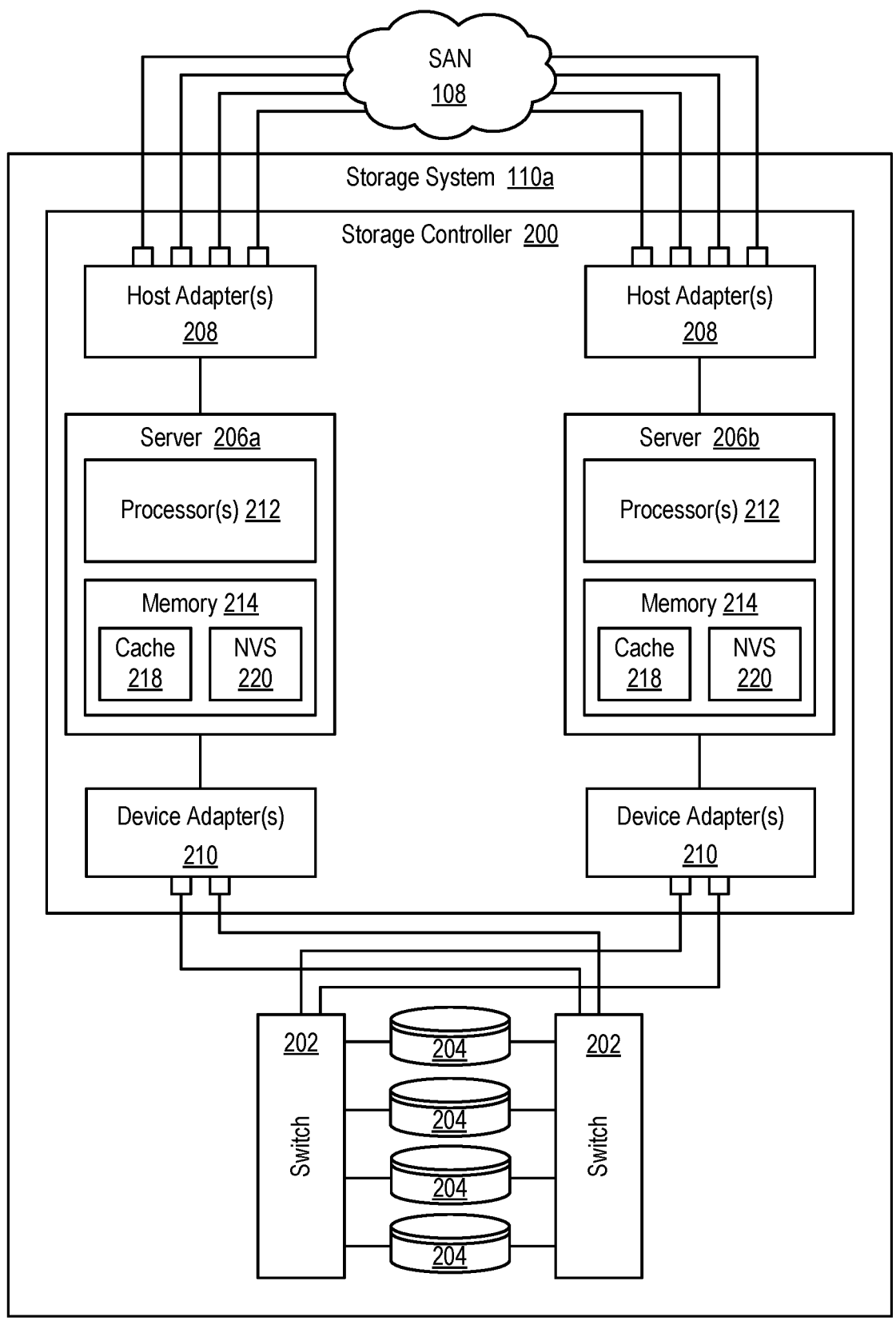
FIG. 2 is a high-level block diagram showing one example of a storage system for use in the network environment of FIG. 1.

Referring to FIG. 2, one embodiment of a storage system 110a containing an array of storage drives 204 (e.g., hard-disk drives and/or solid-state drives) is illustrated. The internal components of the storage system 110a are shown since the systems and methods disclosed herein may, in certain embodiments, be implemented within such a storage system 110a, although the systems and methods may also be applicable to other storage systems. As shown, the storage system 110a includes a storage controller 200, one or more switches 202, and one or more storage drives 204 such as hard disk drives and/or solid-state drives (such as flash-memory-based drives). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. During normal operation (when both servers 206 are operational), the servers 206 may manage I/O to different logical subsystems (LSSs) within the enterprise storage system 110a. For example, in certain configurations, a first server 206a may handle I/O to even LSSs, while a second server 206b may handle I/O to odd LSSs. These servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, flash memory, local disk drives, local solid state drives etc.). The volatile and non-volatile memory may, in certain embodiments, store software modules that run on the processor(s) 212 and are used to access data in the storage drives 204. These software modules may manage all read and write requests to logical volumes in the storage drives 204.

In selected embodiments, the memory 214 includes a cache 218, such as a DRAM cache 218. Whenever a host 106 (e.g., an open system or mainframe server 106) performs a read operation, the server 206 that performs the read may fetch data from the storages drives 204 and save it in its cache 218 in the event it is required again. If the data is requested again by a host 106, the server 206 may fetch the data from the cache 218 instead of fetching it from the storage drives 204, saving both time and resources. Similarly, when a host 106 performs a write, the server 206 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails. In certain embodiments, the NVS 220 is implemented as battery-backed volatile memory in the opposite server 206.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the systems and methods disclosed herein are not limited to the IBM DS8000™ enterprise storage system 110a, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Figure 3:
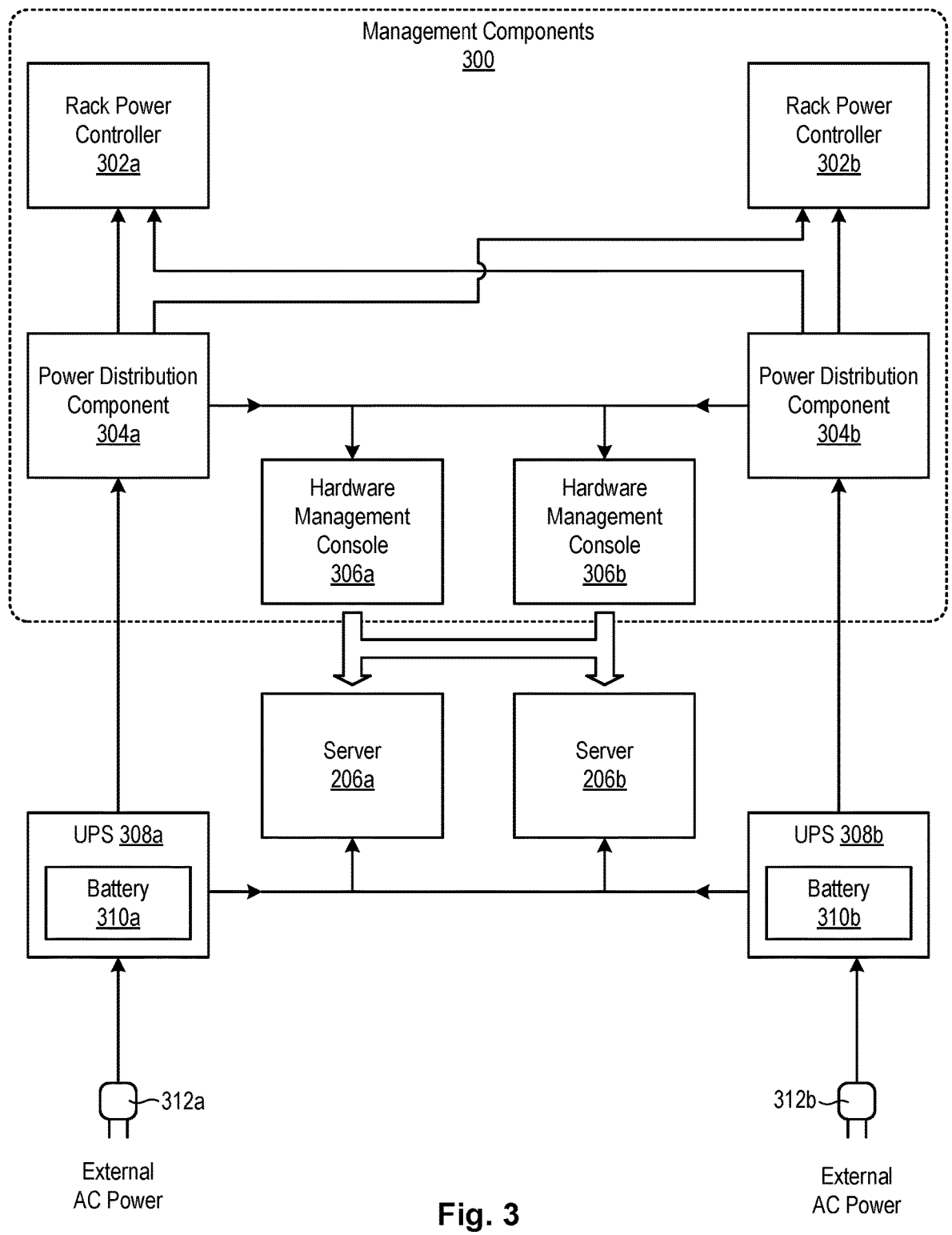
FIG. 3 is a high-level block diagram showing hardware management consoles used to configure and control the storage system of FIG. 2, as well as a power distribution network used to power the hardware management consoles.

Referring to FIG. 3, in certain embodiments, one or more hardware management consoles 306a, 306b (HMCs) may be used with a storage system 110a such as that illustrated in FIG. 2. These hardware management consoles 306 may be used by an administrator to configure and control the storage system 110a, such as the storage servers 206a, 206b, as shown in FIG. 3. FIG. 3 is a high-level block diagram showing the hardware management consoles 306 as well as a power distribution network used to power the hardware management consoles 306 and other components (e.g., the servers 206a, 206b) of the storage system 110a. As shown, in this embodiment, the power distribution network includes a pair of redundant uninterruptible power supplies 308. The uninterruptible power supplies 308a, 308b may contain batteries 310 that supply power to the storage system 110a when external AC power 312 to the storage system 110a is lost. This may enable components of the storage system 110a to gracefully shut down under batter power.

As shown in FIG. 3, the hardware management consoles 306 may, in certain embodiments, be one of various management components 300 in a storage system 110a. In certain embodiments, these management components 300 may be components in a management drawer of the storage system 110a. As shown, the management components 300 may include rack power controllers 302 and power distribution components 304 (e.g., power distribution cards 304) in addition to the hardware management consoles 306. The power distribution components 304 may receive electrical power from the uninterruptible power supplies 308 and distribute the electrical power to the management components 300, such as the rack power controllers 302 and hardware management consoles 306. The rack power controllers 302, by contrast, may control the power distribution to components of the storage system 110a to ensure that they power up or down in the correct order, as well as ensure that components of the storage system 110a consume power efficiently.

As previously mentioned, when external AC power 312 is lost to a storage system 110a such as the IBM DS8000™ storage system, the storage system 110a may terminate data access and initiate, under battery power, shutdown procedures such as dumping data in volatile memory (e.g., cache 218 and/or NVS 220) to more persistent storage. In such cases, the hardware management consoles 306a, 306b of the storage system 110a may gracefully shut down under battery power to avoid problems such as file system corruption. When external AC power 312 is restored to the storage system 110a, the hardware management consoles 306 are typically power cycled (i.e., turned off and then on) to ensure that the hardware management consoles 306 power back up and restart. In some storage system power modes, the hardware management consoles 306 need to be powered up to turn on the rest of the storage system 110a. Thus, if the hardware management consoles 306 are not turned on, the rest of the storage system 110a may not power up and any loss of data access on the storage system 110a may be extended.

The hardware management consoles 306 may also, in certain cases, provide an interface for the storage system 110a to access remote encryption keys. These encryption keys may enable access to encrypted data on the storage system 110a. Thus, if the hardware management consoles 306 are not powered on, the storage system 110a may have no way to access the encryption keys and any loss of data access on the storage system 110a may be extended, even if the storage system 110a is powered up and running.

As previously mentioned, when "off the shelf" uninterruptible power supplies 308 are used in the storage system 110a, there is no guarantee that hardware management consoles 306 will be power cycled when the storage system 110a operates on battery power. If external AC power 312 is restored to an "off the shelf" uninterruptible power supply 308 while it is performing its on-battery shutdown sequence, the uninterruptible power supply 308 may abort the shutdown sequence and never cycle power to components that were running on battery power. This prevents the hardware management consoles 308 from powering on after they have shut down due to the loss of external AC power 312 because the hardware management consoles 306 themselves may have never lost power. Thus, systems and methods are needed to ensure that hardware management consoles 308 are power cycled when a storage system 110a loses external AC power 312. Ideally, such systems and methods will function even when the hardware management consoles 306 themselves never lose power.

Figure 4:
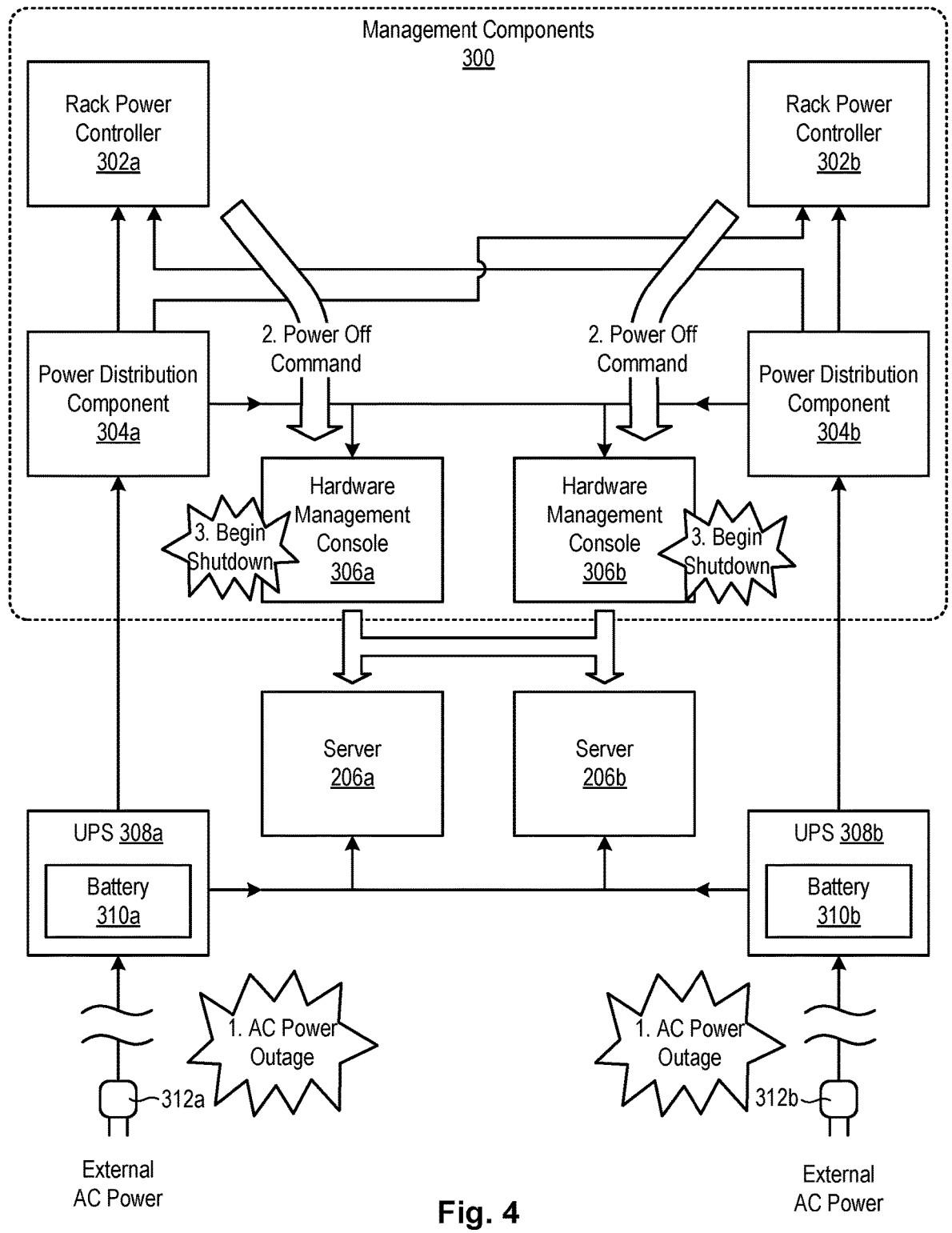
FIGS. 4 through 6 show a sequence of steps that may occur and/or be performed in the power distribution network of FIG. 3 to ensure that the hardware management consoles restart when there is a loss of external AC power.
Figure 5:
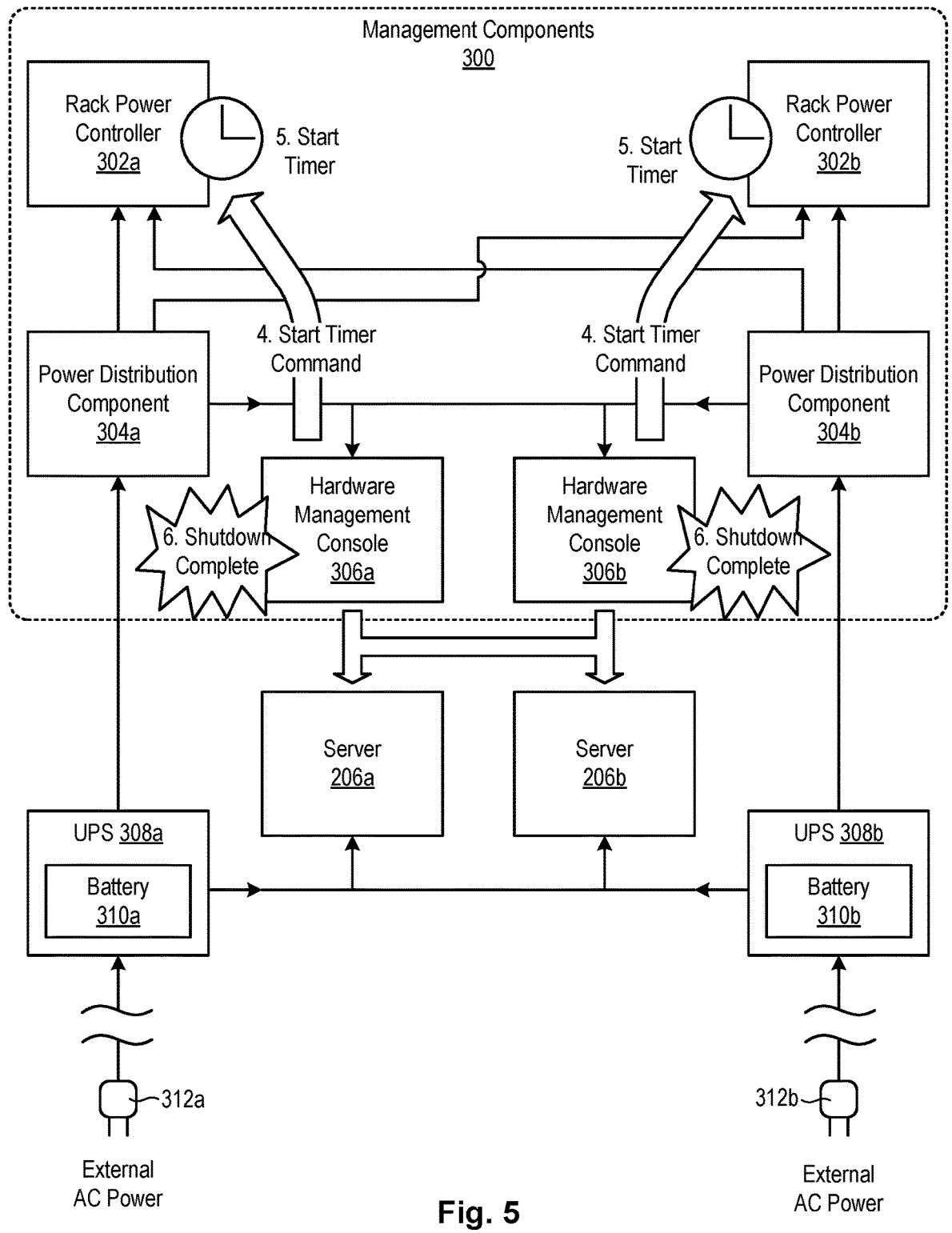
Figure 6:
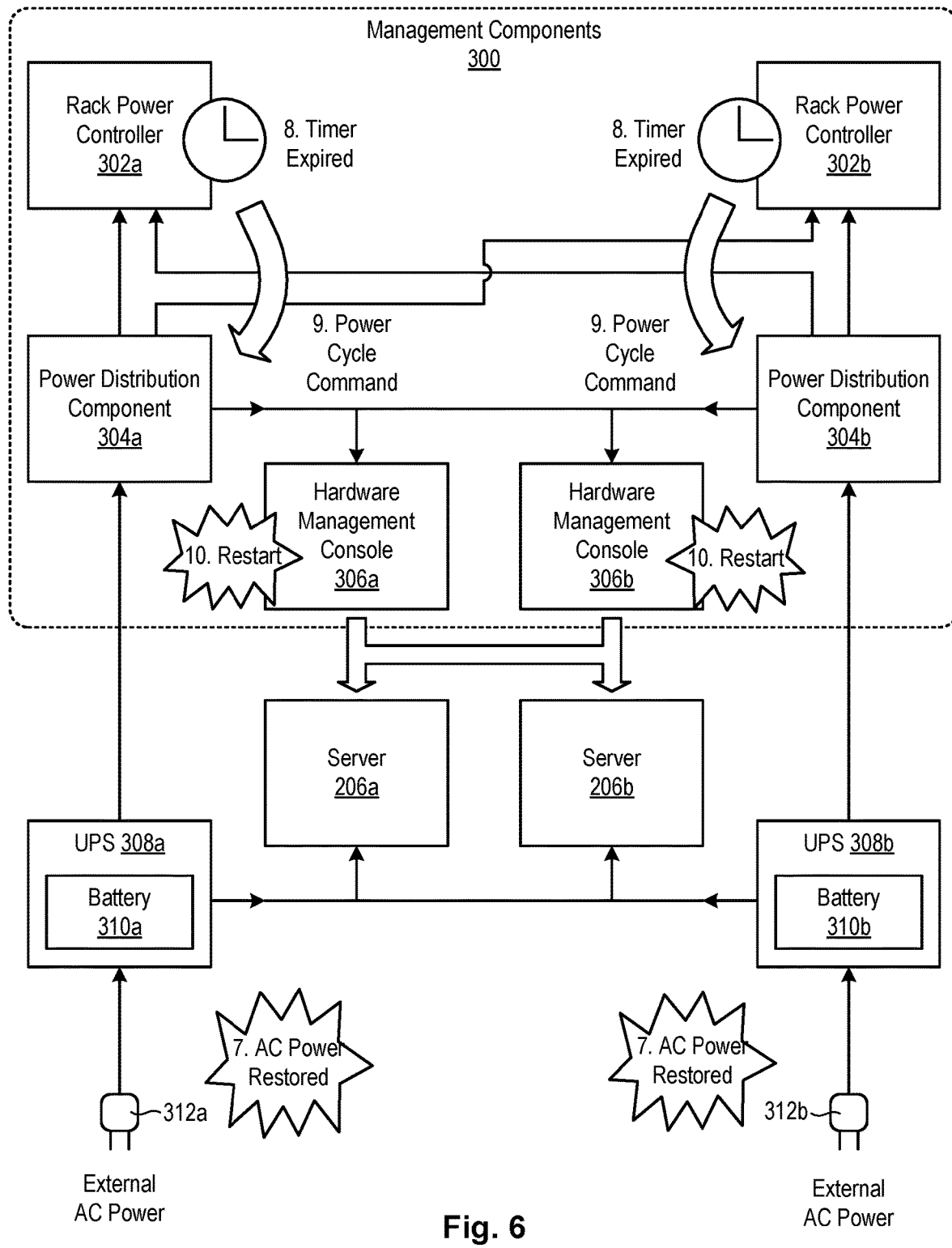

FIGS. 4 through 6 show a sequence of steps that may occur and/or be performed in the power distribution network of FIG. 3 to ensure that the hardware management consoles 306 restart when a storage system 110a loses external AC power and operates on battery power. These steps are numbered to show the order that they may occur. As shown in FIG. 4, a storage system 110a may (1) initially experience an external AC power outage. This may cause the storage system 110a (including the illustrated management components 300) to begin operating on battery power. The rack power controllers 302 may detect that the storage system 110a is operating on battery power and, in response, (2) send a power off command to the hardware management consoles 306. This may cause the hardware management consoles 306 to (3) begin shutdown procedures while the hardware management consoles 306 are operating on battery power.

Referring to FIG. 5, prior to completely shutting down and powering off, the hardware management consoles 306 may (4) send a command to the rack power controllers 302. This command may indicate that the hardware management consoles 306 are powering down and will need a power cycle in order to turn back on. Each rack power controller 302 may receive the command and, in response, (5) start a timer. This timer may be set for a period of time that is longer than the storage system 110a is configured to operate on battery power. For example, if battery power is supplied to the storage system 110a for five minutes after a loss of external AC power 312 (after which battery power to the storage system 110a may be interrupted to prevent complete depletion of the battery 310), the timer may be set for seven minutes. In the event battery power is interrupted to the storage system 110a before external AC power 312 is restored, the rack power controllers 302 may lose power and the timers may terminate. On the other hand, if external AC power 312 is restored to the storage system 110a before battery power is interrupted (i.e., before the five minutes is up in the example provided above), the rack power controllers 302 may never lose power and the timers may continue. Some time after the hardware management consoles 306 have sent commands to the rack power controllers 302 and the rack power controllers 302 have initiated their timers, the hardware management consoles 306 may (6) complete their shutdown and turn off. This may occur even if the hardware management consoles 306 have not lost power.

Referring to FIG. 6, in the event external AC power 312 is (7) restored to the storage system 110a after the hardware management consoles 306 have shut down but before battery power has been interrupted to the storage system 110a, the rack power controllers 302 may continue operating. The timers may continue to run to completion on the rack power controllers 302. Once the timers have expired (e.g., after seven minutes have elapsed in the example provided above), the rack power controllers 302 may send commands to the power distribution components 304 to power cycle the hardware management consoles 306. At this point, the power distribution components 304 may power cycle the hardware management consoles 306 by turning off power to the hardware management consoles 306, waiting for some amount of time (e.g., one minute), and then turning power back on. This will cause the hardware management consoles 306 to restart and follow their normal power up sequence.

Figure 7:
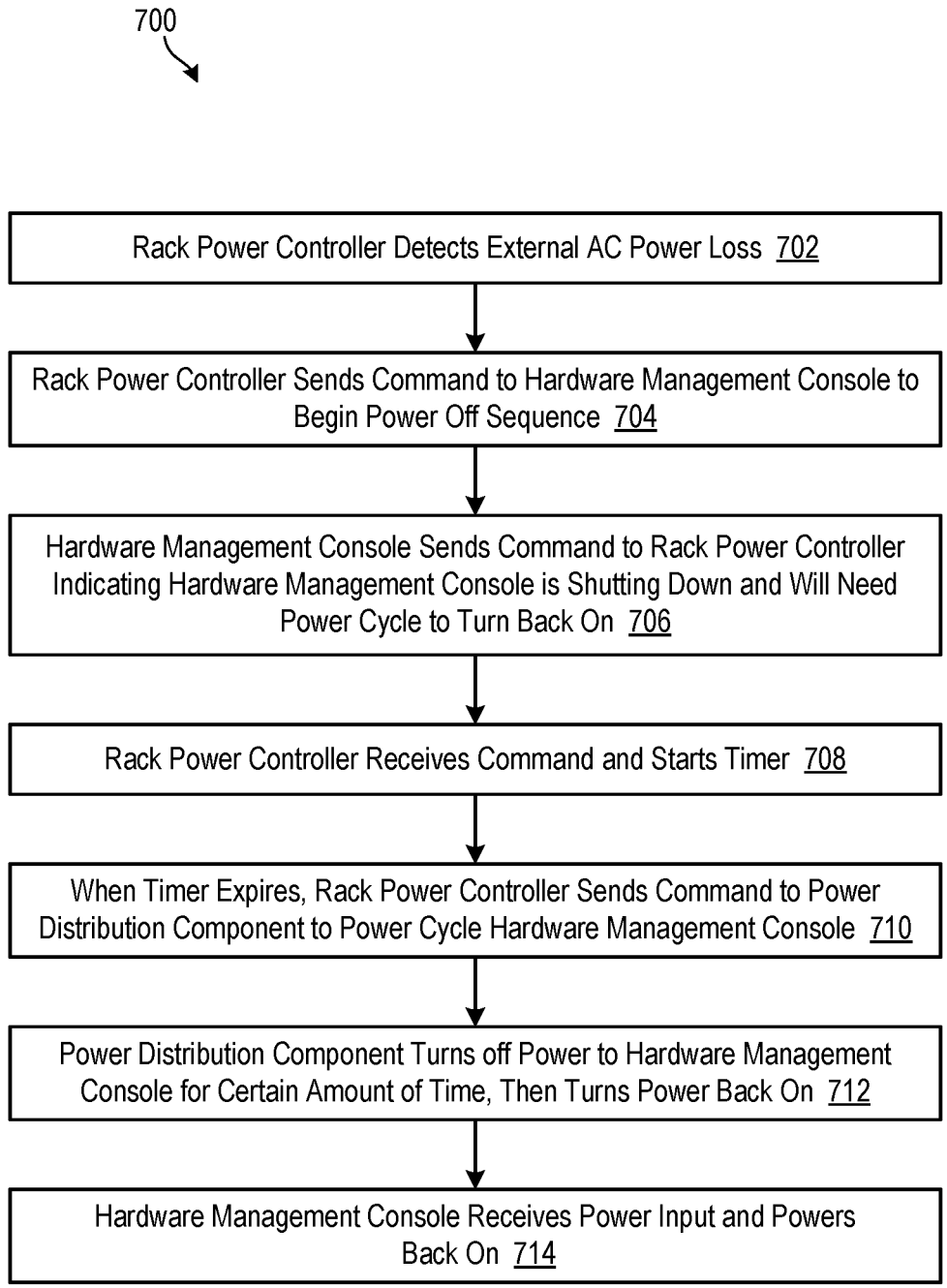
FIG. 7 is a flow diagram showing one embodiment of a method for ensuring that hardware management consoles restart when there is a loss of external AC power.

Referring to FIG. 7, one embodiment of a method 700 for ensuring that hardware management consoles 306 restart when there is a loss of external AC power 312 is illustrated. Thus method 700 summarizes, for the most part, the sequence of steps described in association with FIGS. 4 through 6.

As shown, a rack power controller 302 in a storage system 110a such as that illustrated in FIG. 2 initially detects 702 a loss of external AC power 312 to the storage system 110a. In certain embodiments, the rack power controller 302 is informed of the loss from an uninterruptible power supply 308 that has lost external AC power 312 and has gone "on-battery." In response to detecting the loss of external AC power 312, the rack power controller 302 sends 704 a command to the hardware management console 308 indicating that is should begin to shut down. In the embodiment illustrated in FIGS. 4 through 6, both uninterruptible power supplies 308 may have to lose external AC power 312 before the rack power controllers 302 will begin shutting down components in the storage system 110a.

The hardware management console 308 may receive the command from the rack power controller 302 and begin to shut down. Prior to shutting down, the hardware management console 308 may send 706, to the rack power controller 302, a command indicating that the hardware management console 308 is shutting down and will need to be power cycled (have its power turned off and then back on) in order for it to restart. The form that this command takes may vary.

In certain embodiments, the hardware management console 308 simply informs the rack power controller 302 that it is shutting down and the rack power controller 302 will automatically schedule the hardware management console 308 to be power cycled at some point in the future (e.g., after expiration of a timer). In other embodiments, the hardware management console 308 may actually instruct the rack power controller 302 to power cycle the hardware management console 308 at some point in the future and may, optionally, set the parameters for doing so (e.g., indicate how long the timer should last, etc.).

Upon receiving 708 the command from the hardware management console 308, the rack power controller 302 starts 708 a timer. In certain embodiments, the timer is set to a duration just longer than battery power is configured to be supplied to the storage system 110a. Thus, if the battery power in interrupted before external AC power 312 is restored, power may be cut to the rack power controller 302, thereby terminating the timer before it expires. Because the hardware management console 308 may be on the same power boundary as the rack power controller 302, when power to the rack power controller 302 is interrupted, power to the hardware management console 308 may also be interrupted. Thus, when power is restored to the hardware management console 308, this may automatically power cycle the hardware management console 308, thereby allowing it to restart on its own.

However, in the event external AC power 312 is restored before the battery power is interrupted, power may never be lost by the rack power controller 302 and hardware management console 308. In such a scenario, the hardware management console 308 may need to be power cycled in order for it to restart. In such a scenario, when the timer on the rack power controller 302 expires, the rack power controller 302 may send 710 a command to the power distribution component 304 to cycle power to the hardware management console 308. In response, the power distribution component 304 may turn off 712 power to the hardware management console 306 for some amount of time (e.g., one minute), and then turn 712 the power back on. The hardware management console 306 may then receive 714 power input and power back on.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to ensure that a hardware management console powers up after a storage system loses external AC power, the method comprising:
   detecting loss of external AC power to a storage system, the loss of external AC power causing the storage system to operate under battery power;
   initiating, in response to the loss, shutdown of a hardware management console associated with the storage system;
   starting a timer in response to initiation of the shutdown; and
   power cycling the hardware management console upon expiration of the timer.

2. The method of claim 1, further comprising terminating the battery power after a specified amount of time if the external AC power is not restored.

3. The method of claim 2, wherein the timer is longer than the specified amount of time.

4. The method of claim 1, further comprising aborting the timer in the event the battery power is terminated before external AC power is restored to the storage system.

5. The method of claim 1, wherein power cycling the hardware management console causes the hardware management console to turn on.

6. The method of claim 1, wherein power cycling the hardware management console comprises generating, by a rack power controller, a command to power cycle the hardware management console.

7. The method of claim 6, wherein power cycling the hardware management console comprises receiving, by a power distribution module configured to regulate power to the hardware management console, the command.

8. A computer program product to ensure that a hardware management console powers up after a storage system loses external AC power, the computer program product comprising a computer-readable storage medium having computer-usable program code embodied therein, the computer-usable program code configured to perform the following when executed by at least one processor:
   detect loss of external AC power to a storage system, the loss of external AC power causing the storage system to operate under battery power;
   initiate, in response to the loss, shutdown of a hardware management console associated with the storage system;
   start a timer in response to initiation of the shutdown; and
   power cycle the hardware management console upon expiration of the timer.

9. The computer program product of claim 8, wherein the computer-usable program code is further configured to terminate the battery power after a specified amount of time if the external AC power is not restored.

10. The computer program product of claim 9, wherein the timer is longer than the specified amount of time.

11. The computer program product of claim 8, wherein the timer aborts in the event the battery power is terminated before external AC power is restored to the storage system.

12. The computer program product of claim 8, wherein power cycling the hardware management console causes the hardware management console to turn on.

13. The computer program product of claim 8, wherein power cycling the hardware management console comprises generating, by a rack power controller, a command to power cycle the hardware management console.

14. The computer program product of claim 13, wherein power cycling the hardware management console comprises receiving, by a power distribution module configured to regulate power to the hardware management console, the command.

15. A system to ensure that a hardware management console powers up after a storage system loses external AC power, the system comprising:
   at least one processor;
   at least one memory device operably coupled to the at least one processor and storing instructions for execution on the at least one processor, the instructions causing the at least one processor to:
      detect loss of external AC power to a storage system, the loss of external AC power causing the storage system to operate under battery power;
      initiate, in response to the loss, shutdown of a hardware management console associated with the storage system;
      start a timer in response to initiation of the shutdown; and
      power cycle the hardware management console upon expiration of the timer.

16. The system of claim 15, wherein the instructions further cause the at least one processor to terminate the battery power after a specified amount of time if the external AC power is not restored.

17. The system of claim 16, wherein the timer is longer than the specified amount of time.

18. The system of claim 15, wherein the timer aborts in the event the battery power is terminated before external AC power is restored to the storage system.

19. The system of claim 15, wherein power cycling the hardware management console causes the hardware management console to turn on.

20. The system of claim 15, wherein power cycling the hardware management console comprises generating, by a rack power controller, a command to power cycle the hardware management console.

* * * * *